United States Patent [19]
Oliva

[11] Patent Number: 5,438,344
[45] Date of Patent: Aug. 1, 1995

[54] PORTABLE VIDEO BOOK

[76] Inventor: Anthony Oliva, 56-16 108th St., Corona, N.Y. 11368

[21] Appl. No.: 229,580

[22] Filed: Apr. 19, 1994

Related U.S. Application Data

[63] Continuation-in-part of Ser. No. 64,734, May 19, 1993, abandoned, which is a continuation of Ser. No. 610,365, Nov. 5, 1990, abandoned.

[51] Int. Cl.⁶ .............................................. G09G 3/02
[52] U.S. Cl. .................................... 345/185; 369/50; 434/308; 345/901
[58] Field of Search ............ 345/901, 902, 169; 369/50, 59; 434/308

[56] References Cited

U.S. PATENT DOCUMENTS

| | | | |
|---|---|---|---|
| 4,512,006 | 4/1985 | Murakami et al. | 369/50 |
| 4,545,023 | 10/1985 | Mizzi | 340/712 |
| 4,796,100 | 1/1989 | Sakatuchi | 358/342 |
| 4,855,725 | 8/1989 | Fernandez | 340/706 |
| 4,887,827 | 1/1990 | Raetzer et al. | 368/342 |

FOREIGN PATENT DOCUMENTS

| | | | |
|---|---|---|---|
| 0147027 | 3/1985 | European Pat. Off. | |
| 0147027 | 7/1985 | European Pat. Off. | 345/901 |
| 62-279585 | 5/1986 | Japan | |
| 029585 | 12/1987 | Japan | 345/901 |
| 0157890 | 10/1988 | Japan | 345/901 |
| 63-157890 | 10/1989 | Japan | |

*Primary Examiner*—Ulysses Weldon
*Assistant Examiner*—Matthew Luu
*Attorney, Agent, or Firm*—Collard & Roe

[57] ABSTRACT

A portable video disc displays information on a screen, the source is a CD ROM disc contained within the unit in a removable cartridge. The device can accept several size discs, display text as well as graphics, and display information is several sizes. A memory circuit is continuously connected to a power source so as to retain information even when the unit is turned off. A rocker switch on the front of the unit allows the reader to go forward or back a page.

1 Claim, 3 Drawing Sheets

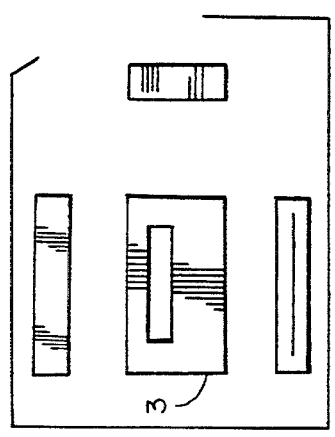
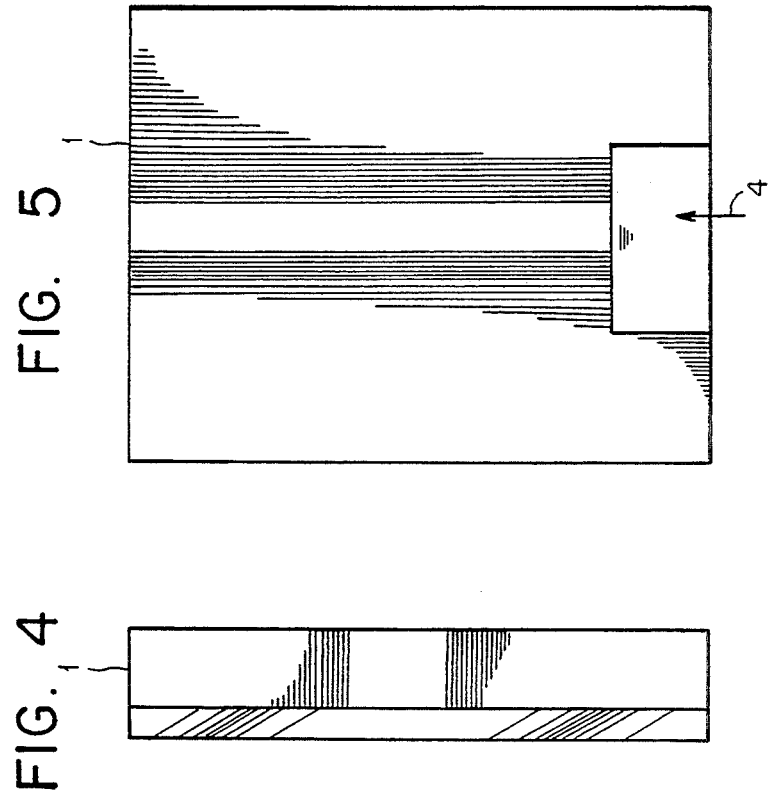
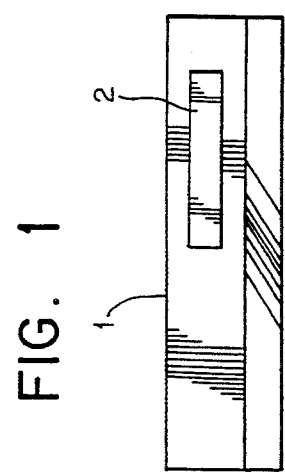
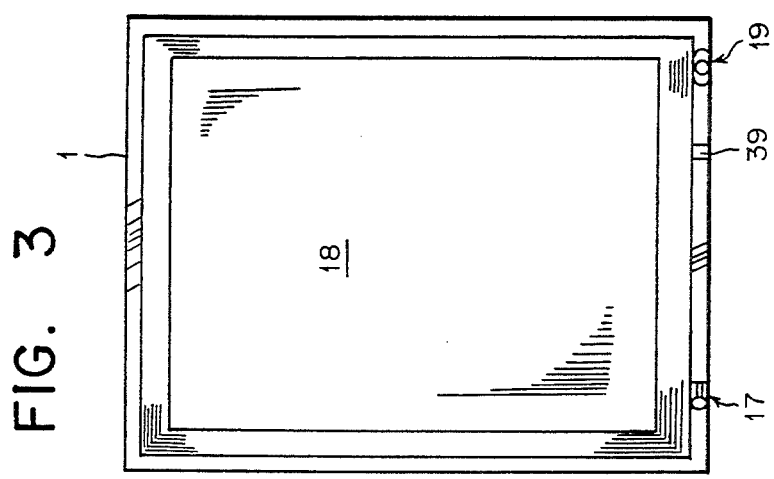

PORTABLE VIDEO BOOK

This application is a continuation-in-part of Ser. No. 08/064,734, filed May 19, 1993, now abandoned, which is a continuation of Ser. No. 07/610,365, filed Nov. 5, 1990, now abandoned.

BACKGROUND OF THE INVENTION

The present invention relates to a portable electronic device which displays information stored on a CD ROM disc. The unit is battery powered and would allow the user to read a book by pressing a button which would display the next screen of text or images. The screen would be of a type which would permit viewing in any type of lighting environment.

Many individuals carry books with them, especially paperback books, to read during idle periods, such as when riding a subway or bus. Many paperback books require two hands to hold the pages open while reading. Also, the printing can be small or of poor quality detracting from the content of the material.

In addition, when the book is completed, it may remain in an open fanned condition. Such a condition makes it difficult to store the paperback because of its unsightliness. Also, paperback books come in all different sizes making it difficult to store large numbers of them.

A similar problem of wear and tear occurs with text books that are loaned to students for a semester. The texts are written in, pages may be missing, and the student may be distracted by these irregularities. Although hard cover textbooks generally are more durable, they are heavy and tend to be much larger than paperback books. This can create a problem for students who need to carry many books back and forth to school each day.

Although hard cover books overcome some of the deficiencies of paperback books, they tend to cost much more and are too bulky to carry around. The present invention solves the problem of having to carry a large number of books by providing a video display which can view a number of texts using a plurality of light weight CD ROM discs.

SUMMARY OF THE INVENTION

It is therefore an object of the present invention to overcome the above described deficiencies and to provide a simpler way to read a book using a portable video CD ROM display.

It is a further object of the present invention to provide a portable video CD ROM display which is simple in design, easy to manufacture and inexpensive in cost.

These and other related objects are attained according to the invention by a portable video book, set within an electronic box. The rectangular box has a slot along one side which receives a cartridge containing a CD ROM disc.

The CD ROM discs come in two sizes which are appropriate for this application. The smaller is a 3" diameter disc which holds 200 megabytes of information. The larger disc is a 5" in diameter and holds 600 megabytes of information (see Hawkins, *Electronics Newsfront,* 1990 Popular Science 42). Many discs could be carried easily because of their compact size, low weight and great durability. Also, even after years of use, the display would remain the same. Furthermore, the unit can be operated with only one hand.

For small children just learning to read, or for individuals with poor eyesight, the display could provide several options for the size of the letters. Also, information provided by the disc need not be limited to text. The displays could include pictures, maps and charts limited only by the graphics capability of the screen.

The back of the box has a small compartment to hold a battery and a sliding door to cover it and hold it in place. On the front is a power switch which would activate the unit causing it to read some portion of the CD ROM disc. The power switch would also activate the screen which occupies most of the front of the unit. The screen is of a type that has its own lighting allowing the user to read under any lighting conditions, for example, a lighted liquid crystal display.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views:

FIG. 1 is a detailed view of the portable video book showing the recessed access door;

FIG. 2 is a detailed view of the CD ROM cartridge;

FIG. 3 is a top view of a portable video book;

FIG. 4 is a side view of the video book shown in FIG. 1;

FIG. 5 is a bottom view of the video book shown in FIG. 1;

DETAILED DESCRIPTION OF PREFERRED EMBODIMENTS

Figure 6:
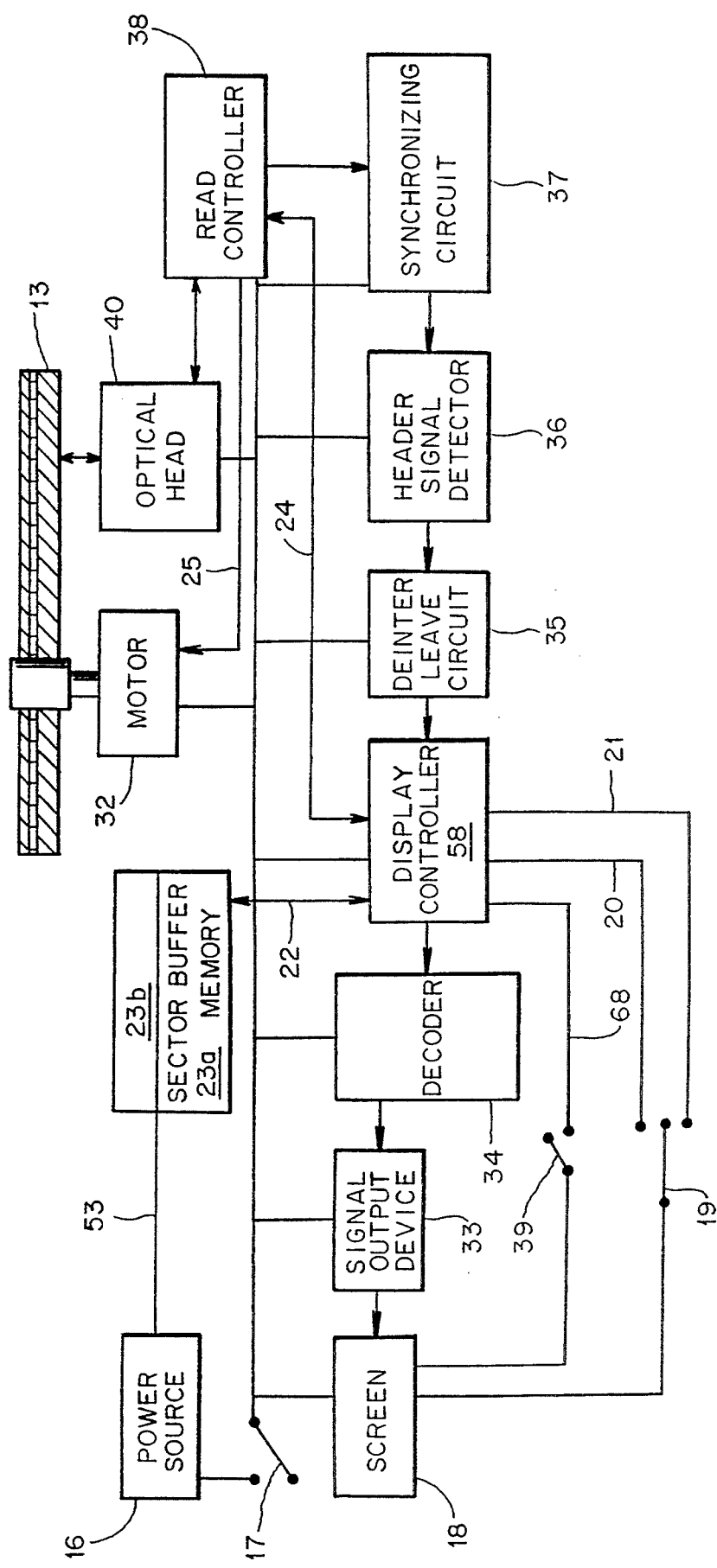
FIG. 6 is a block diagram of the read and processing devices.

Referring to FIGS. 1-5, there is shown a portable video book 1 with a recessed access door 2 which accepts a cartridge 3. The CD ROM discs (not shown for reasons of clarity) are placed into cartridge 3 to protect them when outside of the portable video book 1. A power switch 17, shown in FIG. 3, is switched on and a cartridge 3 is inserted into recessed access door 2. Rear door 4, shown in FIG. 5, holds a battery.

Referring now to FIG. 6, there is illustrated an optical type information read apparatus constructed according to an embodiment of the present invention. The optical disc 13 is of a type commonly known as CD ROM. In such a disc, the information is pre-encoded and the disc is useful for read functions only (read only memory).

Figure 7:
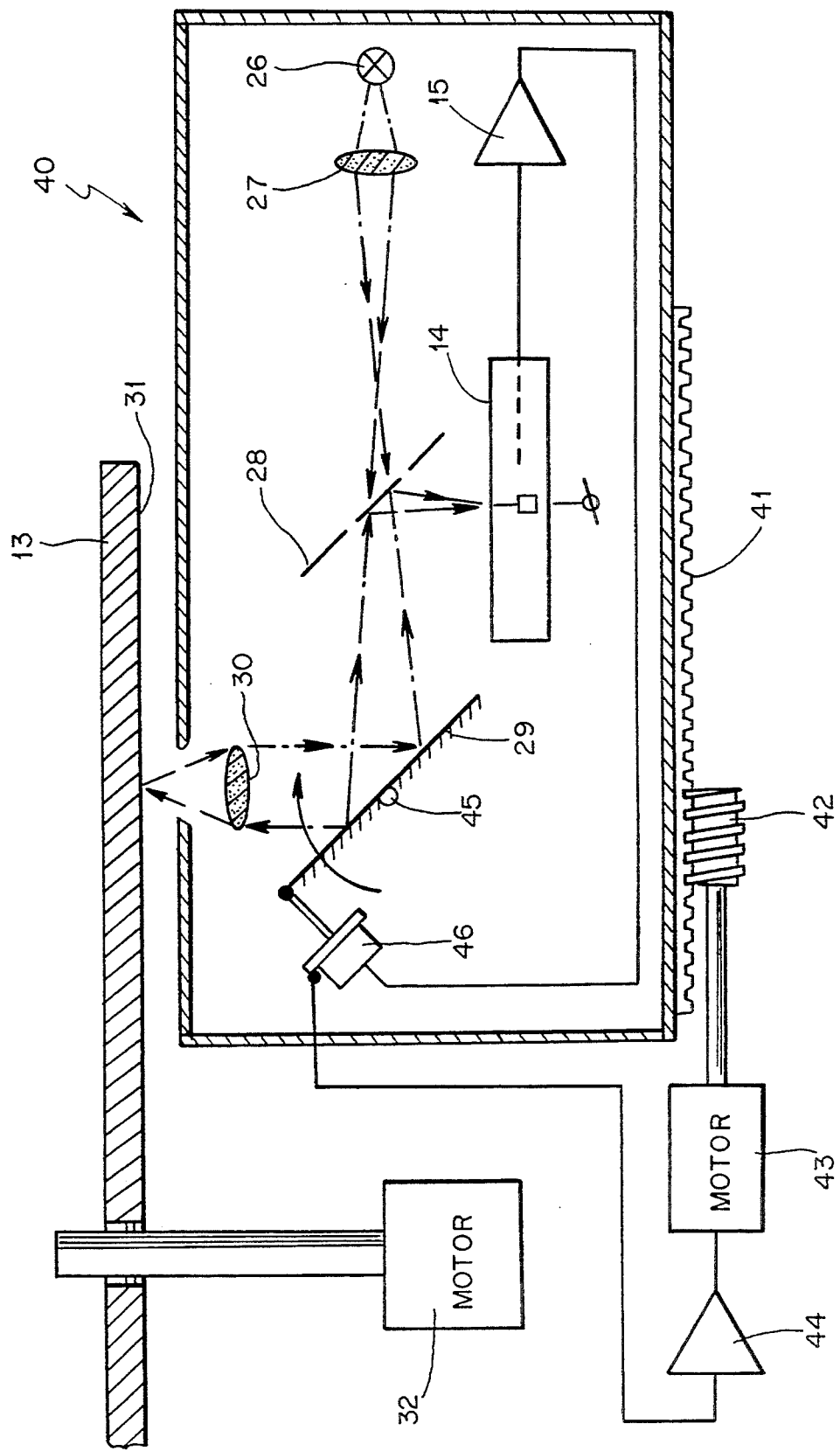
FIG. 7 is a detailed diagram of the optical head 40 from FIG. 6.

Optical disc 13 serves as information storage medium and is rotatably driven by a DC motor 32. Included within optical head section 40, shown in greater detail in FIG. 7, is a known laser oscillator 26 such as a semiconductor laser element, and a lens system 27, 28, 29 and 30 which converges a laser beam oscillated from a directly modulated semiconductor laser device at a predetermined track on optical disc 13.

The direction of the laser beam is controlled, for example, by a servo driven sled and worm follower 41, which is arranged for coarse radial movement along a track below CD ROM disc 13. The sled and worm follower 41 can be driven along the radial track by means a worm gear 42 which is driven by a radial mirror drive motor 43. The motor is driven by a signal provided by a servo amplifier 44 which responds to a control signal derived from the angular position of radial tracking mirror 29. Motor 43 drives worm gear 42 as required for the sled and worm follower 41 to roughly track the spiral recording track. Mirror 29 provides fine control and is mounted for pivotal movement about a pivot 45 adjacent its center. Movement of the mirror about its pivot causes radial movement of the beam. The position of the mirror is controlled by a servo motor 46 which is responsive to minute misalignment between the beam and the recording track.

To maintain focus on the recording track, the reflected beam is first split to produce a main beam and a pair of radial beams (not shown for reasons of clarity) radially displaced from the main beam. When the beam is focused properly, the reflected radial beams will be of equal intensity. When the beam is not focused properly, i.e., off-center, a relative difference in reflected intensities exists. Detector signal motors 43 and 46 vary the position of mirror 29 and the sled and worm follower 41, as required, to maintain radial alignment of the beam with the recording track. Once aligned, the main beam can access information from the recording track. This signal reflects off partial mirror 28 to detector 14. More detailed information on optical read devices can be found in Raetzer et al, Video Disc Player with Rapid Track Access Means, U.S. Pat. No. 4,897,827, the subject matter of which is incorporated herein by reference thereto.

Referring back to FIG. 6, the optical head section 40 and motor 32 are connected to a read controller 38. Read controller 38 is also connected to a display controller 58 through a synchronization circuit 37, a header signal detector 36, and a deinterleave circuit 35.

The electrical output signal from optical head 40 is demodulated by the read controller 38. The demodulated signal is synchronized by the synchronization circuit 37 and is sequentially headed by detecting the header signal included in the sector thus read out by the header signal detector 36. Thereafter the demodulation signal is deinterleaved by the deinterleave circuit 35 and is then stored in the sector buffer memory 23 via display controller 58. The signal thus stored in the sector buffer memory 23 is thereafter retrieved by display controller 58 and error detected and corrected by decoder 34. The information signal included in the sector is isolated from the address signal. The information signal is then supplied to screen 18. More detailed information on optical signal processing devices can be found in Murakami et al, Optical Type Information Read/Write Apparatus, U.S. Pat. No. 4,512,006, the subject matter of which is incorporated herein by reference thereto.

When read controller 38 accesses disc 13 for data, it processes several full screens at one time at the direction of display controller 58. For example, sector buffer memory 23 has capacity to store ten screens or pages of information. When a new disc 13 is loaded into the video book, display controller 58 clears sector buffer memory 23 and loads the first ten screens from the new disc 13 into sector buffer memory 23. When any of screens 1 through 10 are selected, display controller 58 accesses sector buffer memory 23 along line 22 to retrieve the selected information and display it. When page 11 is selected, display controller 58 signals read controller 38 along line 24 for a new group of pages which are then overwritten into sector buffer memory 23.

A page advance control 19 is conveniently designed in the form of a rocker switch placed on the front of the unit below the screen near the readers right thumb (see FIG. 3). Such design permits ease of use since the portable video book can be grasped and the rocker switch operated by one hand. Page advance control 19 can be rocked back, to the left, thus connecting to line 20, as shown in FIG. 6, signaling display controller 58 to display the prior screen. If the prior screen is available in sector buffer memory 23, display controller 58 would retrieve the screen from sector buffer memory 23 along line 22 and display it. If the prior screen was not available in sector buffer memory 23, then display controller 58 would signal read controller 38 via line 24 to access disc 13 for more data preceding the current display.

Page advance control 19 can also be rocked forward, to the right, thus connecting to line 21, signaling display controller 58 to display the next screenful. If the next screen is available in sector buffer 23, then display controller 58 would retrieve it via line 22 and display it. When a requested screen is contained in sector buffer memory 23, the information can be displayed without having to access disc 13, thus saving energy which will otherwise be needed to operate motor 32, optical head 40, read controller 38, synchronizing circuit 37, header signal detector 36 and deinterleave circuit 35. If, however, the requested screen is not currently stored in sector buffer memory 23, then display controller 58 directs read controller 38 via line 24 to retrieve the requested page and several contiguous pages so that a few different pages could be displayed without having to reaccess disc 13.

If the reader has advanced sequentially from page 1 to 10, for example, with a novel, then pages 11–20 will be stored in sector buffer memory 23 when page 11 is requested. However, if the reader has jumped back and forth between pages, for example with a map, then upon request for page 11, only pages 11–15 will be substituted for pages 1–5, leaving pages 6–15 in sector buffer memory 23. In other words, display controller 58 can direct read controller 38 to read any number of pages from one up to the maximum storage capacity of sector buffer memory 23. As can be appreciated, a plurality of different methods may be employed so that display controller 58 can optimize usage of memory 23 depending on the format of information on disc 13 and the readers' reading habits.

In one such embodiment, a reference control 39 is provided adjacent page advance control 19. Reference control 39 is depressed and held down, e.g. for four seconds, to instruct display controller 58 via line 68 to "permanently" store a page in "permanent" part 23b of the sector buffer memory until that disc is removed. Reference control 39 is used to store one or more frequently referred to pages for fast access, i.e. map keys, reference tables, indexes, etc. Display controller 58 will store one or more reference pages in sector buffer memory 23b without overwriting it. For example, the reference pages are stored in "permanent" storage compartment 23b while the other pages, which will be overwritten, are stored in "temporary" storage compartment 23a. Thereafter, momentary depression of reference control 39 will cause display controller 58 to jump to the first reference page. Subsequent momentary depression of reference control 39 will select the next "reference" page. Thus, reference control 39 will both select reference pages and scroll through the reference pages. Optionally, several different reference controls may be provided for direct access to one of several stored reference pages, similar to digital car stereo station recall buttons.

Screen 18 is a lighted liquid crystal display with graphics capabilities which can be seen under any lighting conditions. Such a screen would be able to display information in several sizes.

Power switch 12 connects the components to a rechargeable battery which is held in the rear of the device and accessed by door 4, as shown in FIG. 5. However, sector buffer memories 23*a* and 23*b* are connected directly to the battery through a dedicated power line 53. In this way operation of the power switch does not affect the information stored in the sector buffer memory. When the unit is turned on it will display the information that was previously viewed when the unit was last turned off. If cartridge 3 was removed in the interim, the unit will display information from the new disc.

While only a single embodiment of the present invention has been shown and described, it is obvious that many changes and modifications may be made thereunto without departing from the spirit and scope of the invention.

What is claimed is:

1. A portable video book for displaying information stored on a CD ROM disc carried within said portable video book, the CD ROM disc being stored within a cartridge comprising:
   (a) a housing having an interior space, an exterior and recessed access door for inserting the cartridge and the CD ROM disc contained therein, into said housing surface;
   (b) first circuit means disposed within said interior space, including:
      (i) an optical head for optically reading a signal from said disc;
      (ii) a read controller for demodulating said signal; and
      (iii) a deinterleave circuit for deinterleaving said signal into an information component and an address component;
   (c) second circuit means connected to said first circuit means including a display controller and a sector buffer memory for storing said components said sector buffer memory comprising temporary sector buffer memory and permanent sector buffer memory;
   (d) third circuit means connected to second circuit means, for error-detecting and correcting said information component;
   (e) a liquid crystal video screen connected to said third circuit means, placed on said exterior surface of said housing, which displays said information component; and
   (f) a mechanical page advance rocker switch mounted on said exterior surface of said housing adjacent to said video screen and directly connected to said display controller for displaying another screen by directly signaling said display controller for an additional screen, said display controller selectively
      (i) displaying an additional screen from said temporary sector buffer memory, thus saving energy required to operate said first circuit means, to optically read a signal from said disc, demodulate said signal and deinterleave said signal; and
      (ii) directing said read controller to read a new signal from said disc, demodulate said signal, deinterleave said signal into an information component and an address component and store said information component comprising several screens in said temporary sector buffer memory for transmitting to said video screen; and
   (g) a momentary reference control switch mounted on said exterior surface of said housing adjacent said mechanical page advance rocker switch and connected to said display controller to direct said display controller to permanently store reference data from the CD disc in said permanent sector buffer memory until the CD ROM disc is removed from the portable video book, said momentary reference control switch thereafter directing said display controller to display the permanently stored reference data from said permanent sector buffer memory on said video screen.

* * * * *